(No Model.)

J. W. FISHER.
CULINARY VESSEL.

No. 248,583. Patented Oct. 25, 1881.

Attest:
F. H. Schott.
A. R. Brown.

Inventor:
John W. Fisher,
per J. C. Tasker,
atty.

N. PETERS, Photo-Lithographer, Washington, D. C.

UNITED STATES PATENT OFFICE.

JOHN W. FISHER, OF EVANSVILLE, INDIANA.

CULINARY VESSEL.

SPECIFICATION forming part of Letters Patent No. 248,583, dated October 25, 1881.

Application filed May 31, 1881. (No model.)

*To all whom it may concern:*

Be it known that I, JOHN W. FISHER, a citizen of the United States, residing at Evansville, in the county of Vanderburg and State of Indiana, have invented certain new and useful Improvements in Culinary Vessels; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention relates to culinary vessels; and it consists in an earthenware bowl supported in a metallic ring or body provided with a suitable handle or bail, as hereinafter more fully described and claimed.

Figure 1:
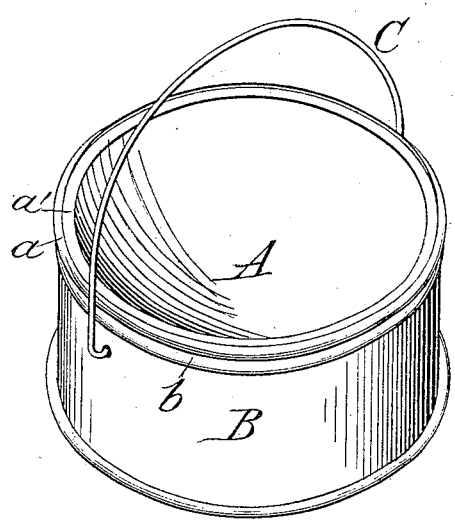
Figure 2:
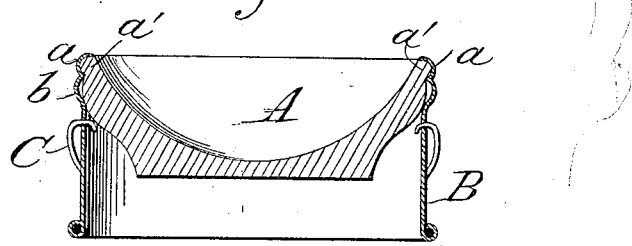

In the annexed drawings, Figure 1 is a perspective view of my improved culinary vessel, and Fig. 2 is a vertical transverse section.

A represents an earthenware bowl, which may be provided with a suitable cover, if desired. This bowl is supported in a metallic ring, B, preferably composed of tin, as being light and easily caused to fit the rim of the bowl, which it clasps firmly, as shown in Fig. 2. For this purpose the ring or body B is provided at the top with the annular corrugations $a\ b$, which are concavo-convex in form, the inner concave surface of the upper annulus, $a$, being made to clasp the convex rim $a'$ of the bowl, while the lower inner edge of the annulus $b$, which adjoins the annulus $a$ below, serves as a shoulder or bearing for the outer convex surface of the bowl. In this manner the bowl and its casing are firmly united so as to leave a space between them, as well as below the bowl, for the circulation of heat when the vessel is placed over the fire or in a vessel of boiling water. The outer casing or ring, B, extends below the bowl and affords a firm support. It is also provided with a suitable handle or bail, C, by which the vessel may be handled.

By this invention a cheap and efficient substitute is furnished for the ordinary porcelain or enamel lined kettles, which, being made almost entirely of metal, are more expensive in construction, as well as objectionable on account of their greater weight.

I am aware that baking-rims or vessels have been attached by a bead-groove to pie-plates and cake-pans so as to extend above and below the edge of the pan, which it fits, and so prevent the escape of its contents. The pan or plate, however, in the instance just referred to is not supported by the rim or casing attached thereto, and is not adapted to be used for the purposes contemplated by my invention.

Having thus described my invention, what I claim as new, and desire to secure by Letters Patent, is—

In a culinary vessel, the combination, with the bowl A, having convex rim $a'$, of the outer casing, B, extending down, as shown, so as to leave a space below and around the bowl, and provided with annular corrugations $a\ b$, the upper annulus clasping the rim $a'$, and the lower annulus adapted to bear against the convex surface of the bowl and forming a shoulder to support the same in its casing, substantially as shown and described.

In testimony whereof I affix my signature in presence of two witnesses.

JOHN W. FISHER.

Witnesses:
HENRY C. GOODING,
ROBERT E. NIGHTINGALE.